United States Patent [19]
Chapin et al.

[11] Patent Number: 5,210,666
[45] Date of Patent: May 11, 1993

[54] SELF-LOADING AIR BEARING SLIDER WITH A RELIEVED LEADING EDGE

[75] Inventors: Robert E. Chapin, Burnsville; Peter Crane, Minneapolis, both of Minn.

[73] Assignee: Seagate Technology, Inc., Scotts Valley, Calif.

[21] Appl. No.: 715,404

[22] Filed: Jun. 14, 1991

Related U.S. Application Data

[63] Continuation-in-part of Ser. No. 528,925, May 25, 1990, Pat. No. 5,128,822.

[51] Int. Cl.$^5$ ............................................. G11B 21/21
[52] U.S. Cl. .................................................. 360/103
[58] Field of Search ..................................... 360/103

[56] References Cited

U.S. PATENT DOCUMENTS

| | | | |
|---|---|---|---|
| 3,678,482 | 7/1972 | Billawala | 340/174.1 E |
| 3,855,625 | 12/1974 | Garnier et al. | 360/103 |
| 4,212,044 | 7/1980 | Plotto | 360/103 |
| 4,218,715 | 8/1980 | Garnier | 360/103 |
| 4,225,891 | 9/1980 | Plotto | 360/103 |
| 4,285,019 | 8/1981 | Scott et al. | 360/103 |
| 4,420,780 | 12/1983 | Deckert | 360/103 |
| 4,475,135 | 10/1984 | Warner et al. | 360/103 |
| 4,555,739 | 11/1985 | Le Van et al. | 360/103 |
| 4,605,977 | 8/1986 | Matthews | 360/103 |
| 4,636,894 | 1/1987 | Mo | 360/103 |
| 4,644,641 | 2/1987 | Verdone | 29/603 |
| 4,670,806 | 6/1987 | Ghose | 360/103 |
| 4,673,996 | 6/1987 | White | 360/103 |
| 4,802,042 | 1/1989 | Strom | 360/103 |
| 4,814,906 | 3/1989 | Suzuki et al. | 360/75 |
| 4,870,519 | 9/1989 | White | 360/103 |
| 4,984,114 | 1/1991 | Takeuchi et al. | 360/103 |
| 4,996,614 | 2/1991 | Okutsu | 360/103 |
| 5,097,369 | 3/1992 | Matsuzaki | 360/103 |

FOREIGN PATENT DOCUMENTS

| | | | |
|---|---|---|---|
| 52-02420 | 1/1977 | Japan | 360/103 |
| 56-134354 | 10/1981 | Japan | 360/103 |
| 57-58267 | 4/1982 | Japan | 360/103 |
| 59-98347 | 6/1984 | Japan | 360/103 |
| 59-119568 | 7/1984 | Japan | 360/103 |
| 59-178648 | 10/1984 | Japan | 360/103 |
| 60-13369 | 1/1985 | Japan | 360/103 |
| 61-204877 | 9/1986 | Japan | 360/103 |
| 62-09574 | 1/1987 | Japan | 360/103 |
| 62-24489 | 2/1987 | Japan | 360/103 |
| 1-319188 | 12/1989 | Japan | 360/103 |
| 3-132981 | 6/1991 | Japan | 360/103 |

OTHER PUBLICATIONS

IBM Technical Disclosure Bulletin, "Air Bearing Magnetic Head Slider", M. F. Garnier, vol. 22, No. 1, p. 332, Jun., 1979.

*Primary Examiner*—Stuart S. Levy
*Assistant Examiner*—Craig A. Renner
*Attorney, Agent, or Firm*—Kinney & Lange

[57] ABSTRACT

A self-loading air bearing disc head slider supports a transducer proximate a rotating disc. The slider includes a slider body having a leading edge, a trailing edge and first and second side edges. First and second side rails are positioned along the first and second side edges, respectively. The first and second side rails each form an air bearing surface. A cross rail is positioned at the leading edge and extends between the first and second side rails. The cross rail includes a relief or "notch" which is recessed from the air bearing surfaces. The relief minimizes debris collection at the leading edge and reduces pitch angle. The leading edge can include a leading edge taper with a relief which communicates with the relief in the cross rail.

8 Claims, 8 Drawing Sheets

SELF-LOADING AIR BEARING SLIDER WITH A RELIEVED LEADING EDGE

CROSS-REFERENCE TO RELATED APPLICATION

This application is a continuation-in-part of U.S. Ser. No. 07/528,925, filed May 25, 1990, issued as U.S. Pat. No. 5,128,822 on Jul. 7, 1992.

BACKGROUND OF THE INVENTION

The present invention relates to transducer head assemblies for magnetic recording on disc drives, and more particularly to self-loading negative pressure air bearing sliders.

Transducer head assemblies that "fly" relative to a rotating disc are used extensively in rotating disc drives. The assemblies include an air bearing slider for carrying a magnetic transducer proximate the rotating disc. A track accessing arm positions the slider and transducer over individual data tracks on the disc surface.

A gimbal is positioned between the slider and the track accessing arm to provide a resilient connection that allows the slider to follow the topography of the disc. The gimbal includes a dimple that is in point contact with the slider. The dimple provides a point about which the slider can pitch and roll while following the topography of the disc.

A self-loading, negative pressure air bearing slider (NPAB) includes a pair of side rails positioned along its side edges and disposed about a recessed area to form a pair of air bearing surfaces. A cross rail extends between the side rails and is positioned near the slider's leading edge.

As the disc rotates, the disc drags air under the slider and along the air bearing surfaces in a direction approximately parallel to the tangential velocity of the disc. As the air passes beneath the side rails, the skin friction on the air bearing surfaces causes the air pressure between the disc and the air bearing surfaces to increase which creates a hydrodynamic lifting force that causes the slider to lift and fly above the disc surface.

The cross rail forms a negative pressure cavity trailing the cross rail, between the side rails. The negative pressure cavity is typically 5 to 10 microns deep. The air expands in this cavity with a consequent decrease in pressure. The pressure in the cavity may become sub-ambient, in which case the integral of pressure over the cavity area provides a self-loading force on the slider which forces the slider toward the disc surface. The self-loading force counteracts the hydrodynamic lifting force developed along the side rails. The counter action between positive and negative forces on the slider reduces flying height sensitivity with respect to disc velocity and increases air bearing stiffness.

The disc tangential velocity is greater at its outer diameter than at its inner diameter. The magnitude of the positive pressure developed along the side rails increases with the sliding velocity. However, the magnitude of the self-loading force also increases with the sliding velocity. The increasing self-loading force prevents the increasing positive pressure from forcing the slider away from the disc. Therefore, the equilibrium clearance of the self-loading air bearing slider is less dependent on sliding velocity than a conventional air bearing slider.

The self-loading air bearing slider is also stiffer than the conventional air bearing slider. This effect is due to relatively large surface areas that are required to support the slider at a specified clearance. The surface area of the self-loading bearing must be larger than that of a conventional bearing, to provide adequate lifting force to resist the self-loading force as well as the spring pre-load applied by the track accessing arm.

Further, the self-loading air bearing slider is less sensitive to altitude than the conventional air bearing slider. When the ambient pressure is reduced by operating the disc drive at an altitude high above sea level, the effects on the positive and negative pressures are similar and tend to cancel each other. Thus, the self-loading air bearing clearance decreases less than a similar conventional air bearing clearance.

It has been found that the advantages of the self-loading bearing are maximized by making the negative pressure cavity area as large as possible. Warner et al. U.S. Pat. No. 4,475,135 disclose a self-loading magnetic head air bearing slider having a pair of side rails and a cross rail which is positioned at its leading edge. The cross rail lies in a plane defined by the side edges and includes a full width taper at the leading edge. The full width taper provides a faster liftoff from the disc surface.

Although the slider disclosed by Warner et al. maximizes the area of the negative pressure cavity, it also has undesirable features. First, the full width leading edge tends to collect wear particles and similar debris. This debris sheds occasionally and is dragged between the slider and the disc, causing increased wear to both the air bearing surface and the disc surface. Second, the cross rail and the leading edge taper cause the slider to fly with an unusually high pitch angle. A very high pitch angle degrades the stiffness of the air bearing.

SUMMARY OF THE INVENTION

A self-loading air bearing disc head slider supports a transducer proximate a rotating disc. The slider includes a slider body having a leading edge, a trailing edge and first and second side edges. First and second side rails are positioned along the first and second side edges, respectively. The first and second side rails each form an air bearing surface. A cross rail is positioned at the leading edge and extends between the first and second side rails. The cross rail defines a negative pressure cavity trailing the cross rail, between the side rails.

The cross rail includes a relief or "notch" which is recessed from the air bearing surfaces. The notch minimizes debris collection at the leading edge and reduces pitch angle. Various other flying characteristics are also improved, such as reduced flying height sensitivity to altitude and higher vertical and roll stiffness. The ratio of notch width to cavity width may range from greater than 0.0 to 1.0.

The slider can also include a leading edge taper which improves take-off performance. In one embodiment, the leading edge taper extends from the first side edge to the second side edge and includes a relief which communicates with the relief in the cross rail.

DETAILED DESCRIPTION OF THE PREFERRED EMBODIMENTS

Figure 1:
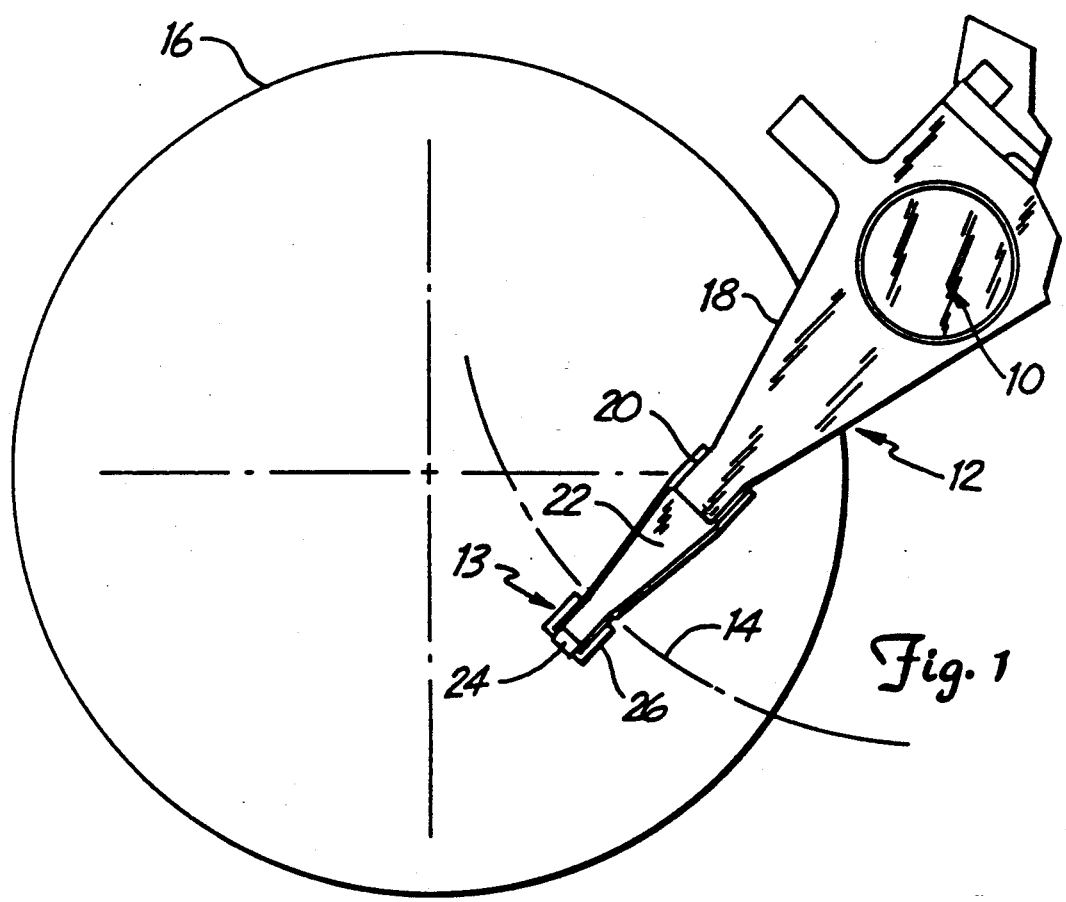
FIG. 1 is a top plan view of a track accessing arm supporting a transducer head assembly over a rotating disk.

FIG. 1 is a top plan view of a track accessing arm supporting a transducer head assembly over a rotating disc. Actuator 10 and track accessing arm 12 support transducer head assembly 13 over disc 16 and move head assembly 13 along arc 14. Arm 12 includes supporting arm 18, base plate 20 and load beam 22. Transducer head assembly 13 includes gimbal spring 24 and air bearing disc head slider 26. Arm 12 is referred to as a rotating actuating arm because actuator 10 rotates 12 to position slider 26 over the various data tracks (not shown) on the disc surface along arc 14. Slider 26 carries a transducer (not shown) which communicates with individual data bit positions on the disc surface.

Figure 2:
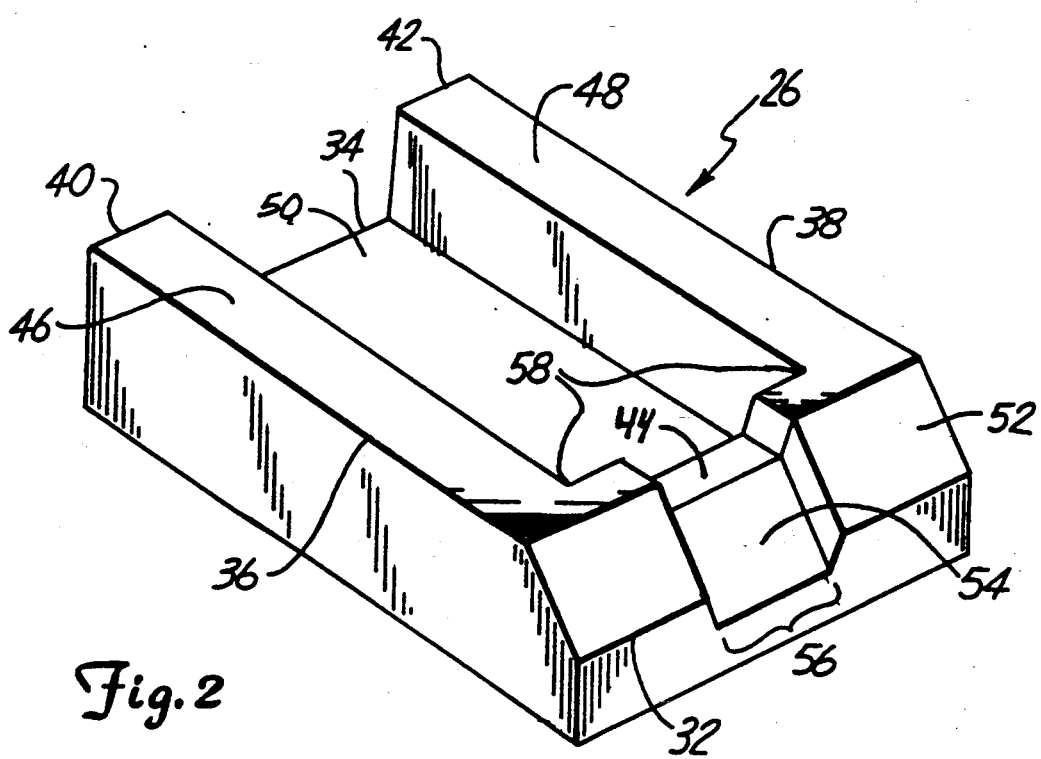
FIG. 2 is a perspective view of a self-loading, negative pressure air bearing slider with a relieved leading edge in accordance with the present invention.

FIG. 2 is a perspective view of slider 26, as viewed from its leading edge. Slider 26 is a self-loading, negative pressure air bearing (NPAB) slider Slider 26 includes leading edge 32, trailing edge 34, first and second side edges 36 and 38, side rails 40 and 42, and cross rail 44. First and second side rails 40 and 42 are positioned along first and second side edges 36 and 38, respectively, and extend between leading edge 32 and trailing edge 34. Cross rail 44 extends between first and second side rails 40 and 42. Side rails 40 and 42 form air bearing surfaces 46 and 48, respectively.

As disc 16 rotates, the disc drags air under slider 26 and along air bearing surfaces 46 and 48 in a direction approximately parallel to the tangential velocity of the disc. As the air passes beneath air bearing surfaces 46 and 48, the skin friction on the air bearing surfaces causes the air pressure between disc 16 and the air bearing surfaces to increase which creates a hydrodynamic lifting force that causes slider 26 to lift and fly above the disc surface.

Cross rail 44 defines a negative pressure cavity 50 trailing the cross rail, between side rails 40 and 42. The air expands in cavity 50 causing a decrease in pressure. The pressure in cavity 50 may become subambient, in which case the integral of the pressure over cavity 50 provides a self-loading force on the bearing which forces slider 26 toward the disc surface. The self-loading force counteracts the hydrodynamic lifting force.

Leading edge 32 includes full-width taper 52 which extends from side edge 36 to side edge 38. Taper 52 directs more air beneath air bearing surfaces 46 and 48 during takeoff causing slider 26 to lift off the disc surface at lower speeds. This reduces the time during which slider 26 is in contact with the disc surface and therefore reduces wear on air bearing surfaces 46 and 48 and on the disc surface In an alternative embodiment, taper 52 does not extend over the entire width of the leading edge 32.

Cross rail 44 includes relief or "notch" 54 which extends from leading edge 32 to negative pressure cavity 50. In the embodiment shown, taper 52 includes a relief which communicates with the relief in the cross rail. Notch 54 minimizes debris collection at leading edge 32 and reduces pitch angle. When slider 26 flies with a positive pitch, leading edge 32 flies at a greater distance from the disc surface than trailing edge 34. Pitch angle is a measurement of the degree of positive pitch.

Notch 54 has a depth of approximately 1.0 micron. However, the depth may be varied to achieve various flying characteristics. In one embodiment, the relief depth in taper 52 is equal to the relief depth in cross rail 44. However, those depths can differ in alternative embodiments. Notch 54 has a notch width 56. Negative pressure cavity 50 has a cavity width 58 between side rails 40 and 42. The ratio of notch width 56 to cavity width 58 ($N_w/C_w$) can vary from a value greater than 0.0 to a value of 1.0. As shown in FIG. 2, notch 54 extends over a central portion of cavity width 58, and has an $N_w/C_w$ ratio of approximately 0.563.

Figure 3:
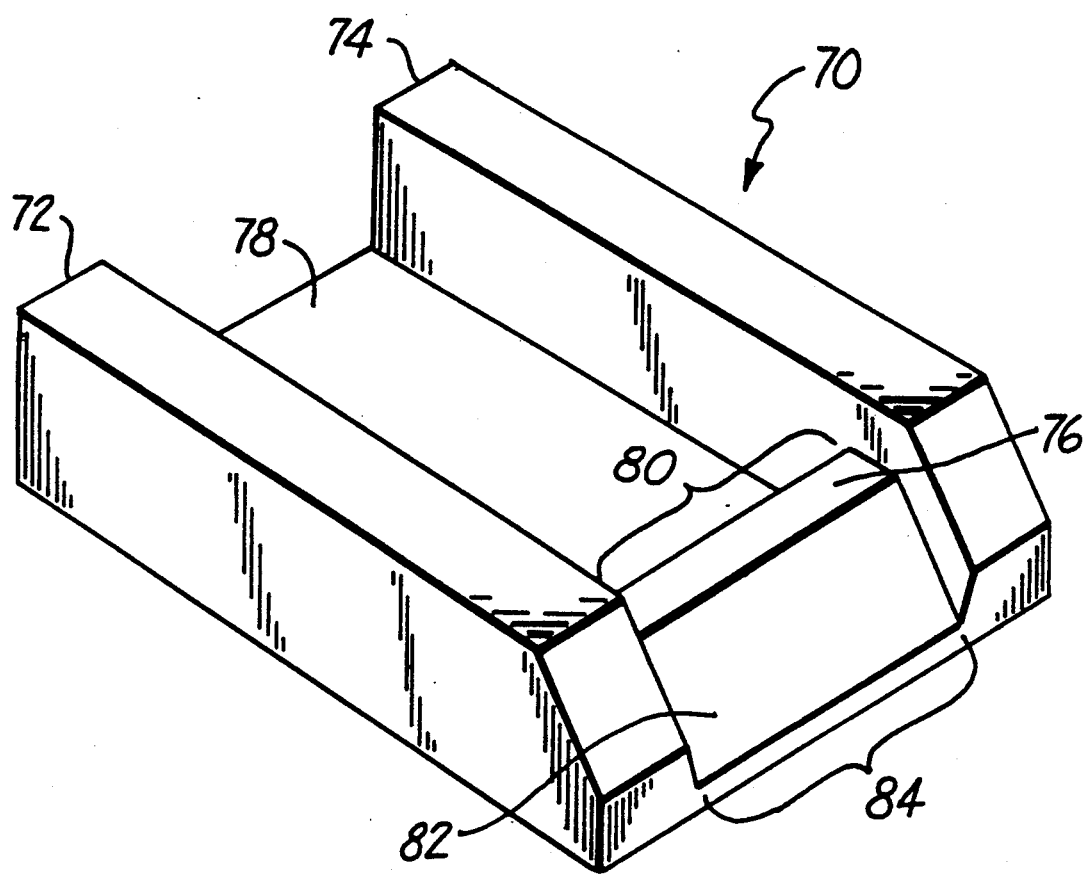
FIG. 3 is a perspective view of a self-loading, negative pressure air bearing slider with a relieved leading edge that has a width equal to the width of its negative pressure cavity.

FIG. 3 is a perspective view of a self-loading air bearing slider having a relieved leading edge with a notch width to cavity width ratio of 1.0. Slider 70 includes first and a second side rails 72 and 74 and cross rail 76. Cross rail 76 defines negative pressure cavity 78 trailing the cross rail, between first and second side rails 72 and 74. Negative pressure cavity 78 has a cavity width 80 between first and second side rails 72 and 74. Cross rail 76 includes notch 82 which has a notch width 84. Notch 82 extends over the entire cavity width 80 from side rail 72 to side rail 74. Therefore, the ratio of notch width 84 to cavity width 80 ($N_w/C_w$) is 1.0.

The effects of the ratio of notch width to cavity width were determined for various flying characteristics by computer simulation analysis. Table I shows takeoff speeds with respect to the ratio of notch with to cavity width ($N_w/C_w$):

TABLE I

| TAKEOFF SPEED VS RATIO OF NOTCH WIDTH TO CAVITY WIDTH | | | |
|---|---|---|---|
| $N_w/C_w$ | 0.000 | 0.563 | 1.000 |
| TAKEOFF SPEED, in/s | 52 in/s | 71 in/s | 89 in/s |

The takeoff speed is minimized at 52 in/s with $N_w/C_w$ = 0.0. A conventional catamaran-type slider (with no cross rail) takes off at a disc speed above 100 in/s. The relatively low takeoff speeds are achieved by positioning the cross rail at the slider's leading edge. The full-width taper at the leading edge further improves takeoff speed.

Figure 4:
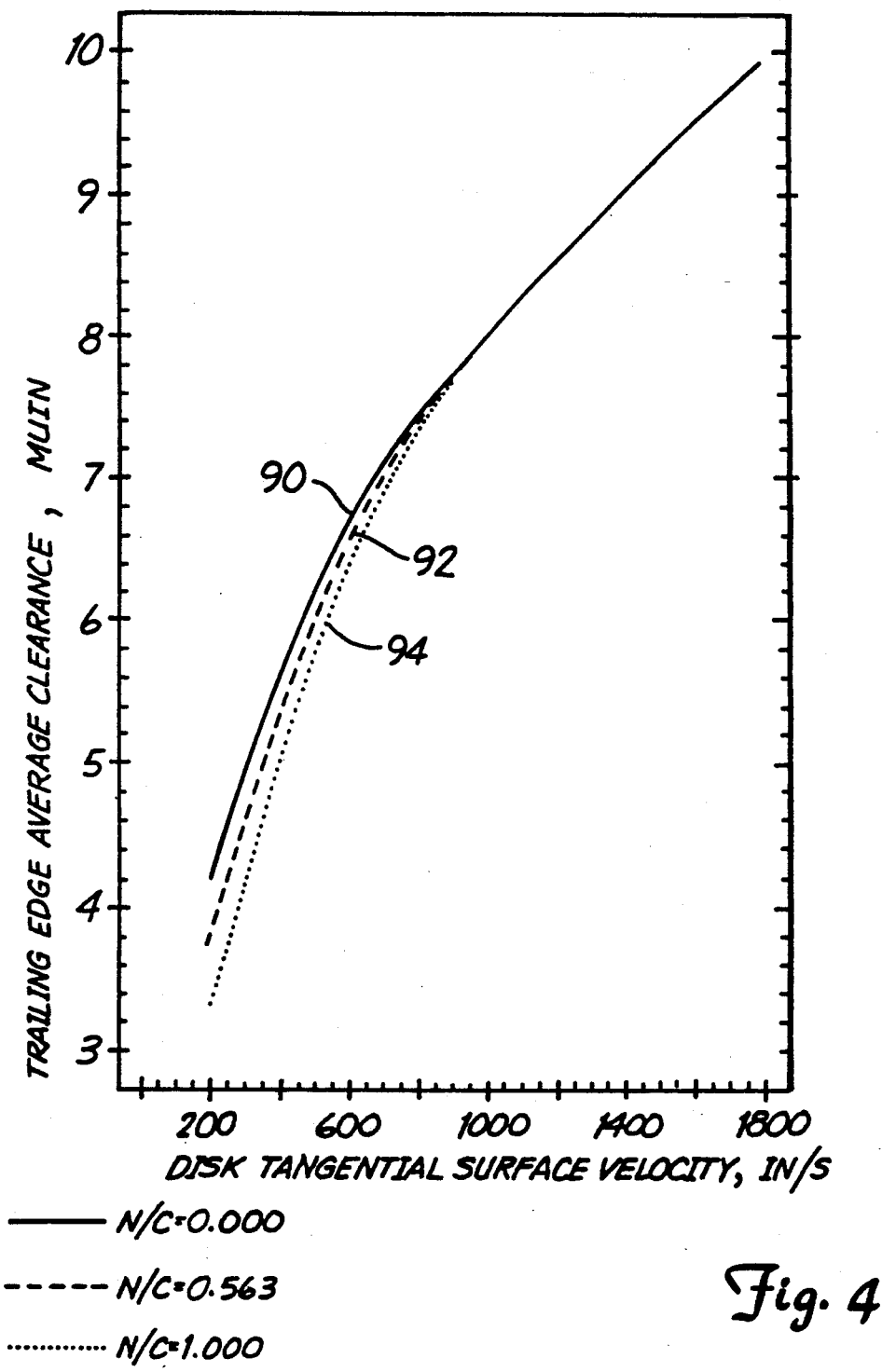
FIG. 4 is a graph which illustrates air bearing clearance with respect to disc velocity.

FIG. 4 is a graph which illustrates air bearing clearance with respect to disc velocity. Flying height is viewed as one of the most critical parameters of non-contact recording. As the average flying height of the slider decreases, the transducer achieves greater resolution between individual data bit locations on the disc. Therefore, it is desirable to have the transducers fly as close to the disc as possible. Flying height is preferably uniform regardless of variable flying conditions, such as tangential disc velocity variation from inside to outside data tracks on the disc surface.

In FIG. 4, air bearing clearance was measured at disc velocities ranging from 200 in/s to 1800 in/s. Solid line 90 represents a slider with a ratio of notch width to cavity width ($N_w/C_w$) of 0.0. Dashed line 92 represents a slider with an $N_w/C_w$ ratio of 0.563. Dotted line 94 represents a slider with an $N_w/C_w$ ratio of 1.00. The graph shows that the notched leading edge results in slightly more velocity sensitivity at low speeds. Therefore, the takeoff speed is consequently minimized with an $N_w/C_w$ ratio of 0.0. This is consistent with the takeoff speed results shown in Table I. At higher speeds, the velocity sensitivities are comparable.

Figure 5:
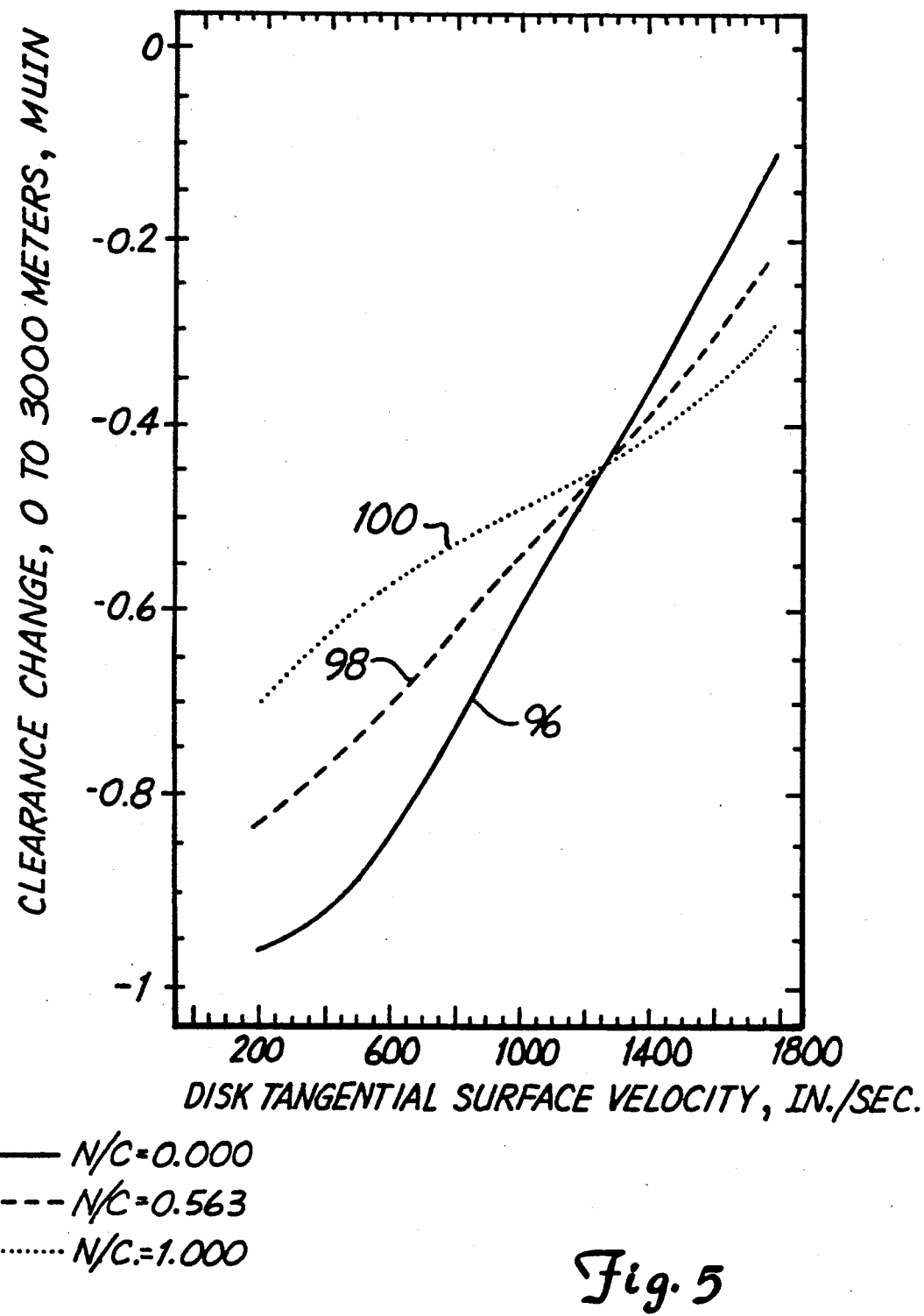
FIG. 5 is a graph which illustrates clearance reduction at 3,000 meters altitude with respect to disc velocity.

FIG. 5 is a graph which illustrates the effect of the notch width to cavity width ratio on altitude sensitivity. Transducer clearance reduction was measured from sea level to 3000 meters altitude with respect to disc velocity for various notch widths. Solid line 96 represents a slider with an $N_w/C_w$ ratio of 0.0. Dashed line 98 represents a slider with an $N_w/C_w$ ratio Of 0.563. Dotted line 100 represents a slider with an $N_w/C_w$ ratio of 1.00. The graph shows that each of the sliders have decreased clearance at high altitude. This effect is worse at low disc speeds. The notched leading edge improves the altitude response at low speeds, and degrades the altitude response at high speeds. The overall result is that the notched leading edge design is generally less sensitive to the reduced ambient pressure at high altitudes.

Figure 6:
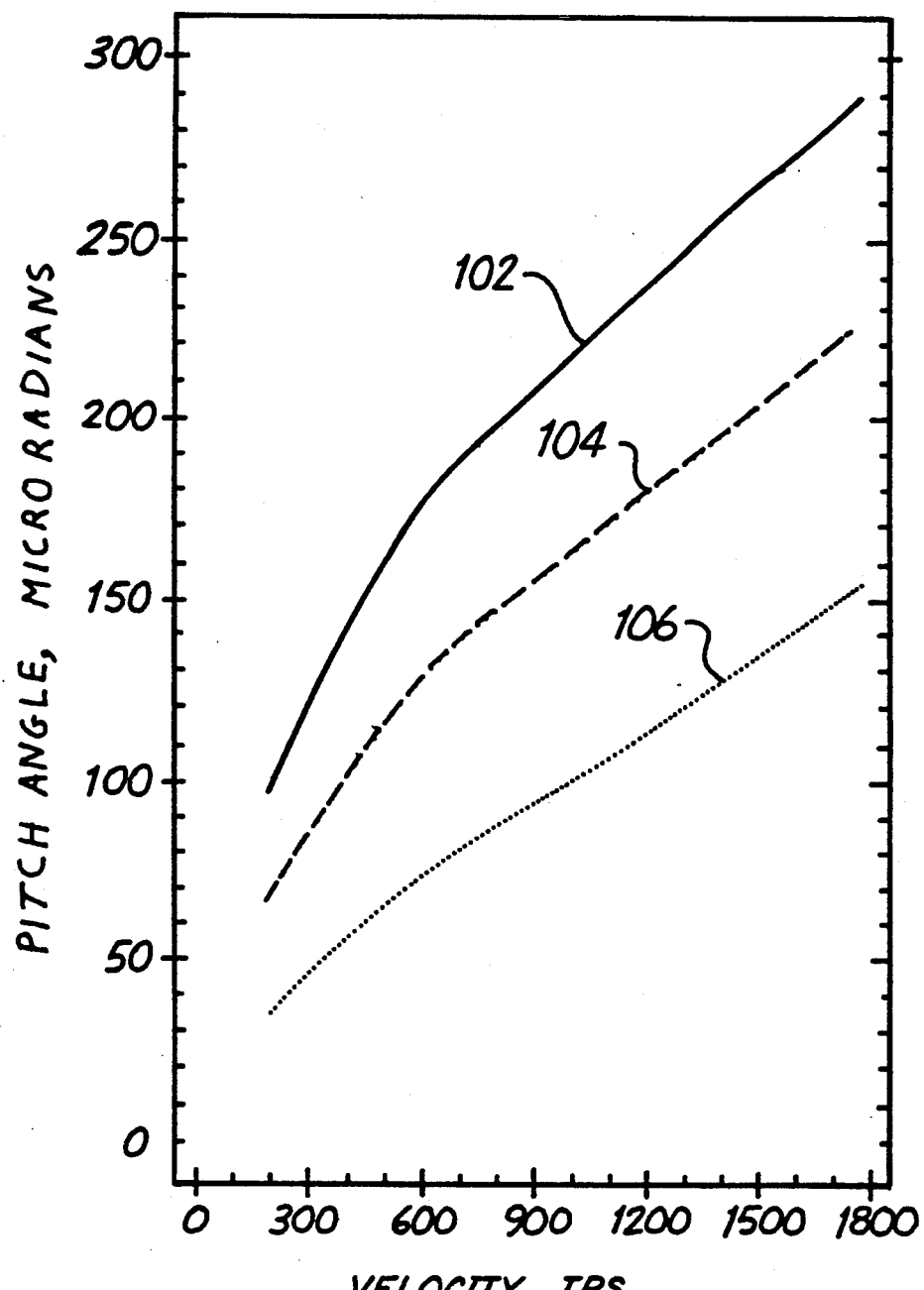
FIG. 6 is a graph which illustrates pitch angle with respect to disc velocity.

FIG. 6 is a graph which illustrates air bearing pitch angle with respect to disc velocity for various ratios of notch width to cavity width. Solid line 102 represents a slider with an $N_w/C_w$ ratio of 0.0. Dashed line 104 represents a slider with an $N_w/C_w$ ratio of 0.563. Dotted line 106 represents a slider with an $N_w/C_w$ ratio of 1.00. Line 102 illustrates that a slider with a cross rail positioned at its leading edge with no notch flies with an unusually high pitch angle. A very high pitch angle degrades the stiffness of the air bearing. Lines 104 and 106 show that the pitch angle can be reduced by increasing the notch width.

Figure 7:
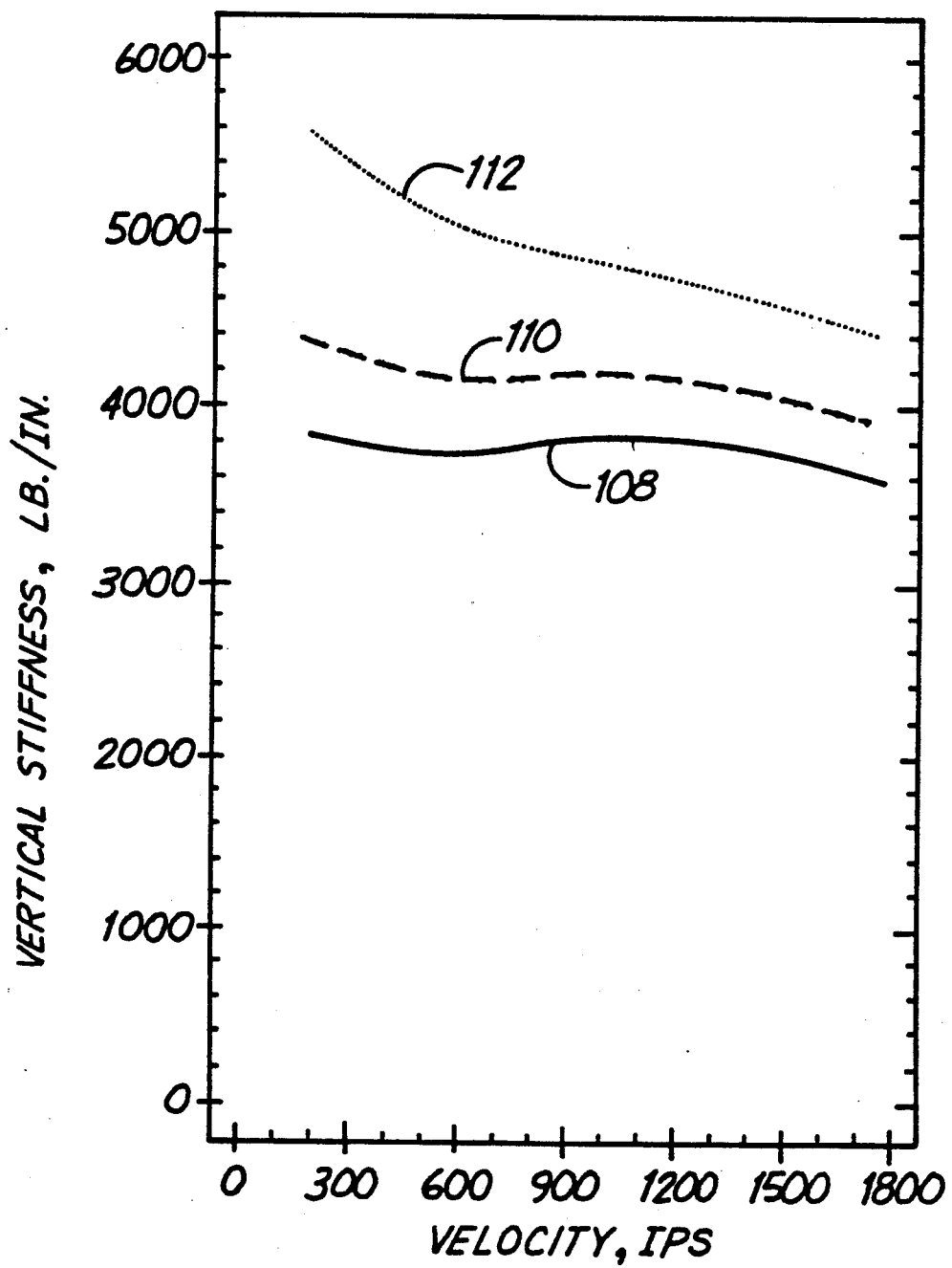
FIG. 7 is a graph which illustrates vertical stiffness with respect to disc velocity.
Figure 8:
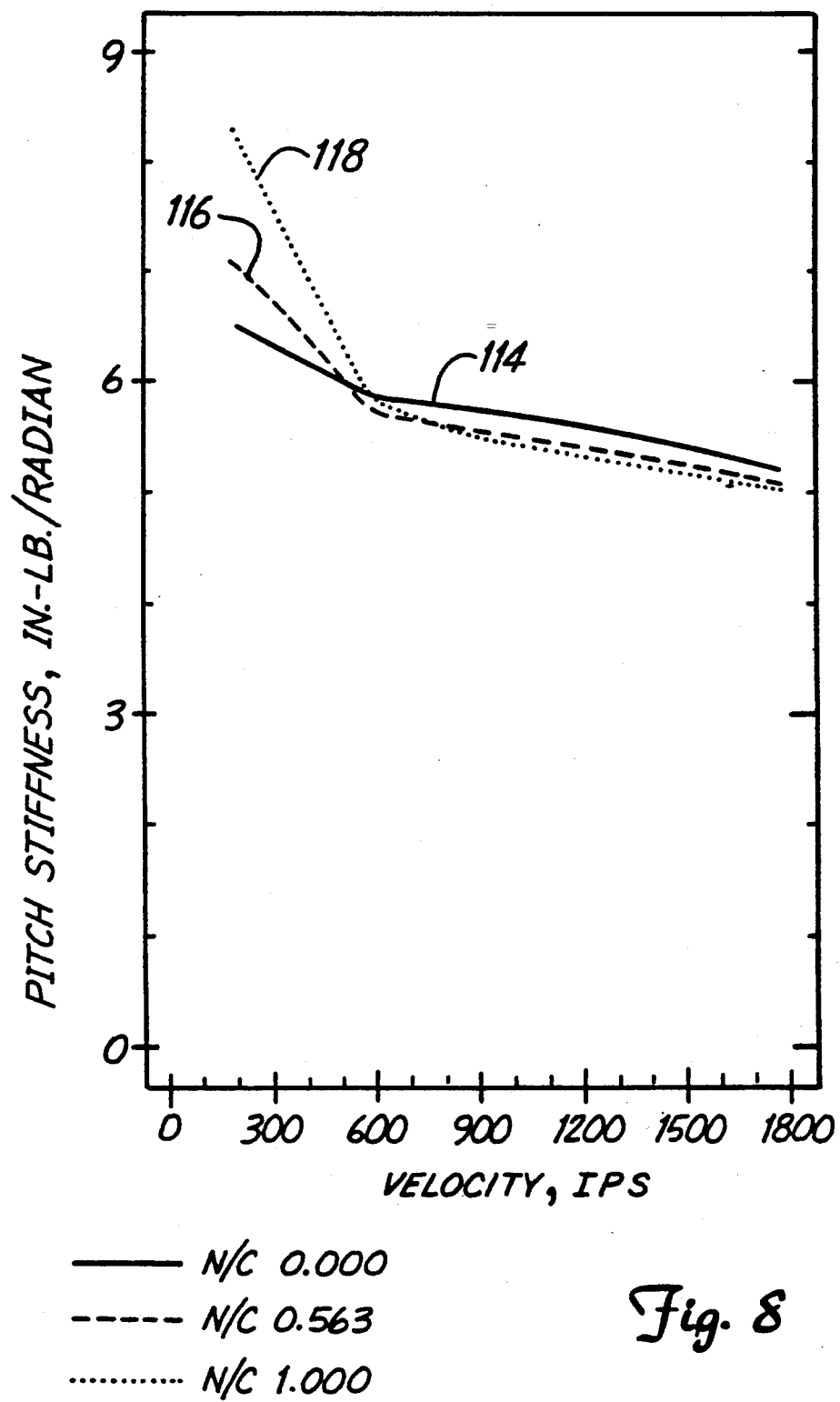
FIG. 8 is a graph which illustrates pitch angular stiffness with respect to disc velocity.
Figure 9:
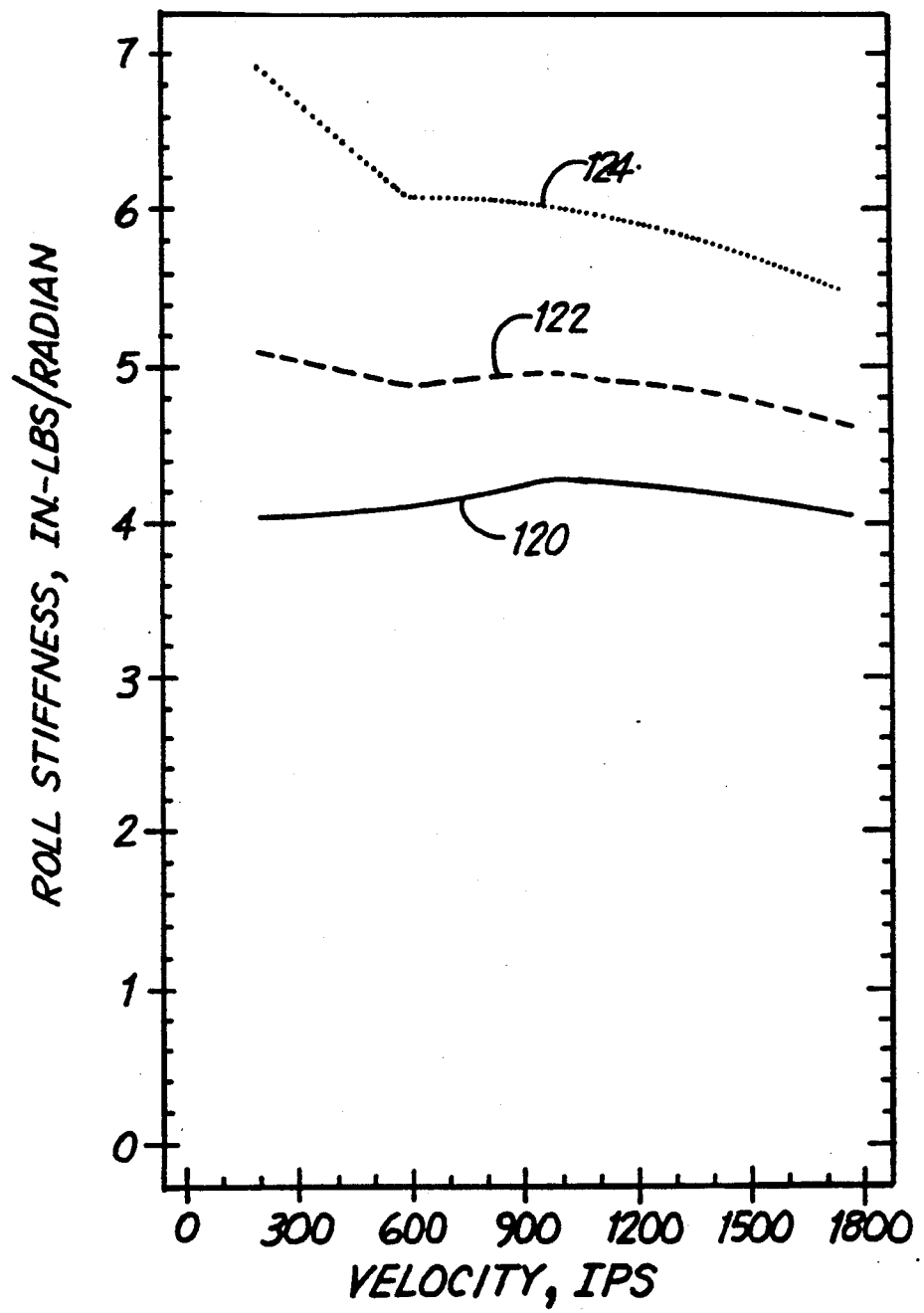
FIG. 9 is a graph which illustrates roll stiffness with respect to disc velocity.

FIGS. 7, 8 and 9 show the effects of the notch width to cavity width ratio on various air bearing stiffnesses. FIG. 7 is a graph which illustrates vertical stiffness with respect to disc velocity. Solid line 108 represents a slider with an $N_w/C_w$ ratio of 0.0. Dashed line 110 represents a slider with an $N_w/C_w$ ratio of 0.563. Dotted line 112 represents a slider with an $N_w/C_w$ ratio of 1.00. Lines 110 and 112 show that vertical stiffness is significantly increased with increasing notch width.

FIG. 8 is a graph which illustrates pitch angular stiffness with respect to disc velocity for various ratios of notch width to cavity width. Solid line 114 represents a slider with an $N_w/C_w$ ratio of 0.0. Dashed line 116 represents a slider with an $N_w/C_w$ ratio of 0.563. Dotted line 118 represents a slider with an $N_w/C_w$ ratio of 1.00. Lines 116 and 118 show that increasing the notch width slightly decreases pitch angular stiffness.

FIG. 9 is a graph which illustrates roll angular stiffness with respect to disc velocity for various ratios of notch width to cavity width. Solid line 120 represents a slider with an $N_w/C_w$ ratio of 0.00. Dashed line 122 represents a slider with an $N_w/C_w$ ratio of 0.563. Dotted line 124 represents a slider with an $N_w/C_w$ ratio of 1.00. Lines 122 and 124 show that the relieved leading edge significantly increases roll stiffness. Roll stiffness is particularly important to the dynamic performance of the slider during a track seek where the transducer accessing arm laterally accelerates, and then decelerates the slider to position the transducer over selected data tracks. Slider roll about its center line degrades the speed at which the track accessing arm can position the transducer over the selected data tracks. This lateral acceleration causes the slider to roll about its centerline. Slider roll about its centerline causes one or the other of the air bearing side rails to approach the disc surface. If the lateral acceleration is strong enough, the side rail approaching the disc may touch the surface and damage it. Therefore, the improved roll stiffness increases reliability and improves access time, since there is more resistance to roll about the centerline. The access time improves because the slider can roll the same amount under a stronger acceleration. Further, with rotary accessing arms, slider skew with respect to the direction of air flow creates unequal pressure distributions beneath the side rails which also causes the slider to roll about its center line. A greater roll stiffness is therefore advantageous.

Although the present invention has been described with reference to preferred embodiments, workers skilled in the art will recognize that changes may be made in form and detail without departing from the spirit and scope of the invention. For example, the leading edge relief of the present invention may be used with a variety of negative pressure air bearing surfaces, such as those disclosed in copending U.S. application of Chapin et al, Ser. No. 07/528,925, filed May 25, 1990. The disclosure of Ser. No. 07/528,925 is hereby incorporated by reference.

What is claimed is:

1. A self-loading air bearing disc head slider configured for supporting a transducer proximate a rotating disc, the slider comprising:
   a slider body having a leading edge, a trailing edge, and first and second side edges;
   first and second side rails positioned along the first and second side edges, respectively, the first and second side rails each forming an air bearing surface;
   a cross rail positioned at the leading edge and extending from the first side rail to the second side rail, the cross rail having a trailing edge;
   a negative pressure cavity extending from the trailing edge of the cross rail toward the trailing edge of the slider body and having a maximum width that is measured between the side rails; and
   a relief formed within the cross rail and extending from the leading edge of the slider body to the trailing edge of the cross rail, the relief having a first tapered surface positioned at the leading edge of the slider body, and a planar surface positioned between the first tapered surface and the trailing edge of the cross rail, wherein the first tapered surface and the planar surface have widths which are measured between the side rails and are substantially less than the maximum width of the negative pressure cavity.

2. The self-loading air bearing disc head slider of claim 1 wherein the relief is recessed by approximately 1.0 microns from the air bearing surfaces.

3. The self-loading air bearing disc head slider of claim 1 wherein the planar surface is recessed from the air bearing surfaces by approximately 1.0 microns and the negative pressure cavity is recessed from the air bearing surfaces by approximately 5.0 to 10.0 microns.

4. The self-loading air bearing disc head slider of claim 1 and further comprising:

a second tapered surface formed in the cross rail and in the side rails, which is raised from the first tapered surface and which extends along the leading edge of the slider body from the first side edge to the first tapered surface and from the first tapered surface to the second side edge.

5. The self-loading air bearing disc head slider of claim 4 wherein:

the planar surface has a depth which is measured from the air bearing surfaces;

the first tapered surface has a depth which is measured from the second tapered surface; and the depth of the planar surface and the depth of the first tapered surface are substantially equal.

6. The self-loading air bearing disc head slider of claim 1 wherein the widths of the first tapered surface and the planar surface are approximately one-half the maximum width of the negative pressure cavity.

7. A self-loading air bearing disc head slider configured for supporting a transducer proximate a rotating disc, the slider comprising:

a slider body having a leading edge, a trailing edge, and first and second side edges;

first and second side rails positioned along the first and second side edges, respectively, the first and second side rails each forming an air bearing surface;

a cross rail extending from the first side rail to the second side rail and having a trailing edge;

a negative pressure cavity extending from the trailing edge of the cross rail toward the trailing edge of the slider body and having a maximum width that is measured between the side rails;

a first tapered surface formed in the cross rail and in the side rails which extends along the leading edge of the slider body from the first side edge to the second side edge; and a relief formed in the cross rail for communicating between the leading edge of the slider body and the negative pressure cavity, the relief having a second tapered surface positioned at the leading edge of the slider body which is recessed from the first tapered surface, and a planar surface positioned between the second tapered surface and the trailing edge of the cross rail, wherein the second tapered surface and the planar surface have widths which are measured between the side rails and are substantially less than the maximum width of the negative pressure cavity.

8. The self-loading air bearing disc head slider of claim 7 wherein the widths of the second tapered surface and the planar surface are approximately one-half the maximum width of the negative pressure cavity.

* * * * *